United States Patent [19]

Gill et al.

[11] Patent Number: 5,078,879

[45] Date of Patent: Jan. 7, 1992

[54] METHOD FOR CONTROLLING SILICA/SILICATE DEPOSITION IN AQUEOUS SYSTEMS USING 2-PHOSPHONOBUTANE TRICARBOXYLIC ACID-1,2,4 AND ANIONIC POLYMERS

[75] Inventors: Jasbir S. Gill, McKees Rocks; Susan P. Rey, Coraopolis; John H. Wiernik, Pittsburgh, all of Pa.

[73] Assignee: Calgon Corporation, Pittsburgh, Pa.

[21] Appl. No.: 546,810

[22] Filed: Jul. 2, 1990

[51] Int. Cl.⁵ .................................. C02F 5/14
[52] U.S. Cl. ................................ 210/699; 210/701; 252/181
[58] Field of Search ......................... 210/696–701; 252/180, 181

[56] References Cited

U.S. PATENT DOCUMENTS

| | | | |
|---|---|---|---|
| 3,923,876 | 12/1975 | Heins et al. | 210/699 |
| 3,959,168 | 5/1976 | Germscheid et al. | 210/700 |
| 4,631,131 | 12/1986 | Cuisia et al. | 210/699 |
| 4,659,481 | 4/1987 | Chen | 210/699 |
| 4,663,053 | 5/1987 | Geiger | 210/700 |
| 4,784,774 | 11/1988 | Amjad et al. | 210/699 |
| 4,874,527 | 10/1989 | Gill | 210/700 |
| 4,913,823 | 4/1990 | Lipinski et al. | 210/699 |

Primary Examiner—Thomas Wyse
Attorney, Agent, or Firm—W. C. Mitchell; J. F. DiPrima

[57] ABSTRACT

A method for controlling the formation of silica/silicate deposits in aqueous systems by adding an effective amount, preferably at least 0.1 ppm, of 2-phosphonobutane tricarboxylic acid-1,2,4 and, optionally, an anionic polymer, preferably a carboxylic/sulfonic polymer, or salts thereof to the aqueous system being treated. Borate or molybdate ion sources may also be added.

6 Claims, No Drawings

METHOD FOR CONTROLLING SILICA/SILICATE DEPOSITION IN AQUEOUS SYSTEMS USING 2-PHOSPHONOBUTANE TRICARBOXYLIC ACID-1,2,4 AND ANIONIC POLYMERS

BACKGROUND OF THE INVENTION

Silica/silicate deposition in aqueous systems, for example boilers, cooling towers and systems containing hypersaline geothermal brines, is a continuing problem. Traditionally, deposition has been controlled by softening the makeup water to the system being treated, by blowdown, or by both. If deposition occurs, mechanical removal or washing with ammonium fluoride or hydrofluoric acid is generally the method of control. Obviously, mechanical or chemical cleaning causes down time and increased energy and labor costs.

pH affects the ionization of silanol groups and, therefore, affects the polymerization rate. It is believed that silica first forms, followed by the formation of three dimensional networks. Eventually, colloidal particles grow through condensation. At pH 7, nuclei formation and particle growth is very rapid. The pH of cooling water is generally 6.0 to 8.5 and the water temperature is generally about 30° to 70° C. The pH of geothermal brines is generally 4.0 to 6.0 and the brine temperature is generally about 100° to 210° C.

It is known to use cationic polymers or cationic surfactants as silica scale inhibitors in hypersaline geothermal brines (Harrar, J. E. et al, "Final Report on Tests of Proprietary Chemical Additives as Anti-scalants for Hypersaline Geothermal Brine", January 1980, Lawrence Livermore Laboratory, Harrar, J. E., et al, "On-Line Tests of Organic Additives for the Inhibition of the Precipitation of Silica from Hypersaline Geothermal Brine IV, Final Tests of Candidate Additives", February 1980. Lawrence Livermore Laboratories; and Harrar, J. E. et al, "Studies of Scale Formation and Scale Inhibitors at the Salton Sea Geothermal Field", Corrosion/80. Paper No. 225, International Corrosion Forum, devoted exclusively to the Protection and Performance of Materials, Mar. 3-7, 1980. Chicago, Ill.).

Also, copending Calgon patent application Ser. No. 290,798 discloses the use of phosphonates such as hexamethylene diamine tetra (methylene phosphonic acid) and diethylene triamine penta (methylene phosphonic acid) and anionic polymers to control silica deposition, and copending Calgon patent application Ser. No. 190,621, discloses the use of phosphonates such as 2-phosphonobutane tricarboxylic acid-1,2,4 and maleic acid/dimethyldiallyl ammonium chloride-type polymers to control silica deposition.

U.S. Pat. No. 3,928,196 discloses the use of copolymers of 2-acrylamido-2-methylpropylsulfonic acid and acrylic acid as scale inhibitors.

U.S. Pat. No. 4,640,793 discloses the use of admixtures containing carboxylic acid/sulfonic acid polymers and phosphonates as scale and corrosion inhibitors.

U.S. Pat. No. 4,618,448 discloses the use of polymers comprising an unsaturated carboxylic acid, an unsaturated sulfonic acid and an unsaturated polyalkylene oxide as scale inhibitors.

Japanese No. 57-084794 discloses the use of copolymers of acrylic acid and allyl polyethylene glycol as scale inhibitors.

European patent application 84301450.7 discloses carboxylic acid/sulfonic acid copolymers in combination with organic phosphonates as scale inhibitors.

U.S. Pat. No. 4,510,059 discloses the use of carboxylic functional polyampholytes to reduce silica deposits in aqueous systems.

U.S. Pat. No. 4,432,879 discloses the use of 2-phosphonobutane-1,2,4-tricarboxylic acid and methacrylic acid/2-acrylamido-2-methylpropyl sulfonic acid polymers to disperse solid matter such as clay including China Clay ($Al_2O_3 \cdot 2H_2O \cdot 2SiO_2$) in aqueous systems. Threshold inhibition of silica/silicates is not disclosed or suggested.

U.S. Pat. No. 4,532,047 discloses a method of inhibiting amorphous silica scale formation using polypolar organic compounds and borate ion sources.

U.S. Pat. No. 4,584,104 discloses a method of inhibiting amorphous silica scale formation using a source of orthoborate ions.

BRIEF DESCRIPTION OF THE INVENTION

The instant inventors have discovered a method for controlling the deposition of silica and silicates in an aqueous system using 2-phosphonobutane tricarboxylic acid-1,2,4 or a salt thereof, alone or preferably in combination with a water soluble anionic polymer. The anionic polymer is preferably prepared from at least one carboxylic acid moiety, alone or in combination with at least one sulfonic acid moiety and, optionally, at least one polyalkylene oxide moiety. Terpolymers are preferred.

2-phosphonobutane tricarboxylic acid-1,2,4, or a salt thereof, is itself an effective inhibitor. This compound and its salts inhibit silica deposition in aqueous systems. Thus, when this compound is added to waters containing silica and hardness at a pH of about 9.0, it inhibits the formation of silicates and their deposition on surfaces in contact with the treated waters. For example, approximately 10 mg/L of 2-phosphonobutane tricarboxylic acid-1,2,4 has been shown, at a dosage of about 20 mg/L at 2 cycles of concentration, to effectively maintain 250-280 mg/L $SiO_2$ and 180-200 mg/L hardness without substantial deposition on system surfaces. It has also been found that anionic polymers generally enhance the efficacy of 2-phosphonobutane tricarboxylic acid-1,2,4. Borate ion sources and molybdate ion sources can also be used to enhance silica inhibition.

DETAILED DESCRIPTION OF THE INVENTION

The instant invention is directed to a method for controlling silica/silicate deposition in an aqueous system containing silica or prone to silica/silicate deposition comprising adding to said system an effective amount of a composition comprising: A) 2-phosphonobutane tricarboxylic acid-1,2,4 or a salt thereof; and, optionally, B) a water soluble anionic polymer; wherein polymer B), if used, is selected from the group consisting of homopolymers of acrylic acid, homopolymers of methacrylic acid, polymers comprising acrylic acid and methacrylic acid, hydrolyzed polyacrylamides, homopolymers of maleic acid or anhydride and, polymers comprising acrylic acid and/or methacrylic acid and at least one other polymerizable unsaturated water-soluble monomer selected from the group consisting of polyalkylene oxides such as allyl polyalkylene glycols, methallyl polyalkylene glycols, polyalkylene glycol acrylates or methacrylates and methoxyallyl polyalkylene glycols, 2-hydroxypropyl acrylate, vinyl sulfonic acid, vinyl phosphonic acid, vinyl acetate, ethyl vinyl ether, acrylamide, ethyl acrylate, ethyl methacrylate, 2-acrylamido-2-methylpropyl sulfonic acid, 2-methacrylamido-2-methylpropyl sulfonic acid, styrene sulfonic acid, sulfoalkyl acrylate, sulfoalkyl methacrylate, allyl sulfonic acid, methallyl sulfonic acid, 3-methacrylamido-2-hydroxypropyl sulfonic acid, and salts thereof. Blends of such polymers and water soluble salts of such polymers can also be used.

While the use of an anionic polymer is optional, such use is also preferred.

Methods for preparing the above polymers are well known in the water treatment art. Also, many of the above polymers are commercially available from various suppliers.

Preferred polymers for use as component B) in the instant compositions and methods are selected from the group of polymers consisting of homopolymers of acrylic acid or methacrylic acid and polymers comprising (i) about 35 to about 95%, preferably about 50 to about 90%, by weight, of an unsaturated mono-carboxylic acid selected from the group consisting of acrylic acid and methacrylic acid;

(ii) about 5 to about 65%, preferably about 10 to about 50%, by weight, of an unsaturated sulfonic acid selected from the group consisting of 2-acrylamido-2-methylpropyl sulfonic acid and 2-methacrylamido-2-methyl propyl sulfonic acid; and, optionally;

(iii) 0 to about 40%, preferably 0 to about 30%, by weight, of an unsaturated polyalkylene oxide.

Any water-soluble unsaturated polyalkylene oxide compound may be used as (iii) in the preferred polymers. Examples include, but are not limited to, allyl polyalkylene glycols, methallyl polyalkylene glycols, polyalkylene glycol acrylates, polyalkylene glycol methacrylates, and methoxy allyl polyalkylene glycols. The preferred unsaturated polyalkylene oxide compounds are unsaturated polyethylene compounds and unsaturated polypropylene equivalents thereof, and their ether derivatives. More preferably, unsaturated polyethylene compounds are used. Also, mixtures of polyethers formed from unsaturated polyethylene oxide with other polyalkylene oxides, such as propylene or butylene oxide, may be used. The unsaturated polyether chain may be capped with an alkyl, aralkyl, sulfonate or phosphonate group metal or ion, or uncapped.

The most preferred unsaturated polyalkylene oxide compounds for use as moiety (iii) are selected from the group consisting of allyl polyethylene glycols of the formula CH$_2$=CH—CH$_2$ (OCH$_2$CH$_2$)$_n$ OH or CH$_2$=CH—CH$_2$ (OCH$_2$ CH$_2$)$_n$ OCH$_3$, wherein n is 5-10, and polyethylene glycol acrylates or methacrylates of the formula:

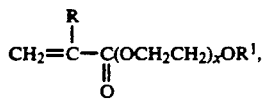

wherein R and R$^1$, which may be the same or different, are selected from the group consisting of H and C$_1$-C$_3$ lower alkyls, preferably CH$_3$, and wherein x is 1-20. The most preferred moieties are polyethylene glycol methacrylates of the formula:

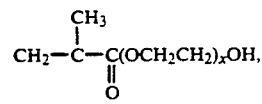

wherein x is 1 to 10, preferably 3-7.

The above described preferred polymers are commercially available from Calgon Corporation, Pittsburgh, Pa. Alternatively, such polymers may be prepared by free radical polymerization techniques which are well known in the art. See, for example, U.S. Pat. No. 4,680,135.

The most preferred polymers for use as component B) in the instant compositions and methods are selected from the group consisting of homopolymers of acrylic acid and salts thereof, copolymers comprising about 35 to 95%, by weight, preferably about 50% to about 90%, of acrylic acid and about 5 to about 65, by weight, preferably about 10 to about 50%, of 2-acrylamido-2-methyl propyl sulfonic acid salts thereof, such as TRC-233 ®, which is commercially available from Calgon Corporation, and terpolymers comprising acrylic acid, 2-acrylamido-2-methylpropyl sulfonic acid and polyethylene glycol monomethacrylate, and salts thereof, such as TRC-271 ®, which is commercially available from Calgon Corporation. If terpolymers are used, the most preferred terpolymers comprise about 50 to about 80%, by weight, of acrylic acid or a salt thereof, about 10 to about 30%, by weight, of 2-acrylamido-2-methyl propyl sulfonic acid or a salt thereof, and about 5 to about 15%, by weight, of polyethylene glycol monomethacrylate.

The molecular weight of the instant polymers is not critical; however, it is preferred that the molecular weight be less than about 1,000,000, as determined by light scattering methods or gel permeation chromatography. Preferably, the molecular weight should be less than about 100,000 and most preferably less than about 50,000. The instant polymers may be applied to the system being treated as part of an aqueous solution which also contains 2-phosphonobutane tricarboxylic acid-1,2,4 or a salt thereof.

If polymer B) is used, the ratio of A):B), by weight, should range from about 1:10 to about 10:1, preferably from about 1:3 to about 3:1.

Additionally, if polymer B) is used, a molybdate ion source or a borate ion source may be added. Molybdate ions are preferred, as molybdate-containing compositions unexpectedly solubilize species such as calcium ions, magnesium ions and SiO$_2$ Any source of molybdate or borate ions can be used. The preferred molybdate ion source is ammonium molybdate, and the preferred borate sources are described in U.S. Pat. Nos. 4,504,104 and 4,532,047 which are hereby incorporated into this specification by reference. If a molybdate or borate ion source is used as component C), the weight ratio of components A) and C) should range from about 1:5 to about 5:1. Molybdate ion sources and borate ion sources are commercially available.

An effective amount of 2-phosphonobutane tricarboxylic acid-1,2,4 or salt thereof should be added to the aqueous system being treated. As used herein, the term "effective amount" is that amount necessary to control silica/silicate deposition in the system being treated. Generally, the effective amount will range from about 0.1 to about 200 ppm, on an active basis, based on the total weight of the aqueous system being treated, preferably from about 1 to about 200 ppm.

As used herein, the term "controlling silica/silicate deposition" is meant to include inhibition of silica polymerization, threshold precipitation inhibition, stabilization, dispersion, solubilization, and/or particle size reduction of silica, silicates, especially calcium and magnesium silicates, and silicon ions. Clearly, the instant additives are threshold silicate precipitation inhibitors, but it is believed that they also stabilize, disperse and solubilize silica and silicates. Thus, the inventors have discovered that 2-phosphono tricarboxylic acid-1,2,4 and salts thereof, alone and in combination with the designated polymers and, optionally, a molybdate or borate source, inhibit, minimize or prevent silica deposition under severe operating conditions, and intend that the instant specification describe this discovery, without attempting to describe the specific mechanism by which silica/silicate deposition is prevented or inhibited.

The term "aqueous system", as used herein, is meant to include any type of system containing water, including, but not limited to, cooling water systems, boiler water systems, desalination systems, gas scrubber water systems, blast furnace water systems, reverse osmosis systems, evaporator systems, paper manufacturing systems, mining systems and the like.

The use of 2-phosphonobutanes tricarboxylic acid-1,2,4 or a salt thereof is critical to the instant method in that it, alone, reduces, inhibits and/or prevents silica/silicate deposition under severe saturation and/or temperature conditions.

The polymers of the instant invention, if used, are commonly available. Molybdate and borate ion sources are also commonly available.

The compositions disclosed herein effectively control silica/silicate deposition in aqueous systems which have high alkalinity, high calcite saturation and/or high pH values. Such conditions are often times encountered as cycles of concentration increase. Thus, the instant 2-phosphonobutane tricarboxylic acid-1,2,4 compositions provide silica/silicate protection under severe conditions where conventional silica control agents may be ineffective.

The instant compositions may be added to the system being treated by any convenient means, and the components may be added separately or in combination. A preferred method of addition is via makeup water streams.

Additionally, other conventional water treatment agents, including corrosion inhibitors such as tolyltriazole, can be used with the instant polymers.

EXAMPLES

The following examples demonstrate the use of the instant compositions to inhibit silica/silicate deposition. These examples are not intended to limit the scope of the instant invention in any way.

In these examples, the following compounds were tested:

PBTA, which is 2-phosphonobutane tricarboxylic acid-1,2,4, commercially available from Mobay as Bayhibit AM.

PMA, which is polymaleic anhydride, commercially available from Ciby Geigy as Belclene 200.

Ammonium molybdate, which is a source of $MoO_4^{2-}$ ions.

AA/HPA, which is a copolymer of acrylic acid and 2-hydroxypropyl acrylate, commercially available from National Starch as Natrol 42.

PAA, which is a homopolymer of acrylic acid, sodium neutralized, having a weight average molecular weight of about 2200, commercially available from Calgon Corporation.

AA/AMPSA[1], which is a 60/40 (w/w) polymer of acrylic acid and 2-acrylamido-2-methylpropyl sulfonic acid having a weight average molecular weight of about 8200, as determined by gel permeation chromatography (GPC), commercially available from Calgon Corporation.

AA/AMPSA/POE, which is a 70/20/10 (w/w/w) polymer of acrylic acid, 2-acrylamido-2-methylpropyl sulfonic acid and polyethylene glycol methacrylate of the formula:

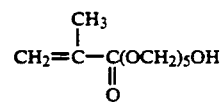

having a weight average molecular weight of approximately 10,000, as determined by GPC, commercially available from Calgon Corporation.

Test Method

The following procedure was used to evaluate the ability of the instant polymers to prevent the formation and deposition of calcium and magnesium silicates.

A two-liter polypropylene flask having a side arm was filled to the 1500 ml level with makeup water as described in Table I. The temperature of the makeup water was controlled and maintained by immersing an electrically heated 304 stainless steel heat-exchanger into the polypropylene flask. A refractive index liquid level sensor was placed in the side arm to maintain a constant volume in the flask by controlling a solenoid valve on inlet line from the makeup water reservoir.

Evaporation was achieved by passing filtered dry air or nitrogen at a regulated and measured rate through a teflon tube placed at the bottom of the flask. The makeup water was concentrated to various levels (i.e., cycled-up) by controlling the rate of aeration. The pH of the system was controlled by feeding acid or alkali as required by the set point pH on a pH-stat device.

After reaching the targeted cycles of concentration, the cycles were maintained constant for several days. This simulated the operating procedure commonly used in industrial cooling towers. In this case the makeup water in the reservoir was replaced by distilled water to stop further concentration. The makeup water described in Table I was selected because it is stable at room temperature and it gives a sufficient induction time to establish the concentration process before any mineral precipitation occurs. The pH of the makeup water was adjusted to 8-9 and was maintained at the selected pH in the flask during the entire cycling up process. The makeup water contained 10 mg/L of the designated inhibitor. Aliquots were withdrawn at various time intervals, filtered, and analyzed for chloride, calcium, magnesium and silica. The cycles of concentration were determined based on the chloride concentration in the cycled up water. The expected concentration of the other species in solution was then calculated based on the cycles of concentration. The amount of deposit on the heat exchanger was determined by weighing the heat exchanger at the beginning and at the end of each run.

The results are shown in Tables II, III and IV.

TABLE I

CHEMICAL COMPOSITION OF THE MAKEUP WATER

| Ion | Total Concentrations (mg/L) |
|---|---|
| Calcium | 100 |
| Magnesium | 7.5 |
| Sodium | 153 |
| Chloride | 199 |
| Sulfate | 219 |
| Silica | 150 |

TABLE II

Inhibition of Silica/Silicate at pH 9.0 ± 0.2 Using Air or Nitrogen For Cycling-Up and Holding Constant Cycles (1.8–2.0) for 2–3 Days

| Additive | Inhibitor Dosage (mg/L) | Cycling-up Medium | % Inhibition Deposit | Retention in Solution (mg/L) | | |
|---|---|---|---|---|---|---|
| | | | | $SiO_2$ | Ca | Mg |
| Bayhibit AM | 10 | $N_2$ | 97 | 72 | 87 | 84 |
| | 10 | Air | 5 | 74 | 31 | 0 |
| | 20 | Air | 15 | 79 | 69 | 11 |
| AA/ | 2 | Air | * | 80 | 3 | 62 |
| AMPSA | 10 | Air | 80 | 88 | 56 | 62 |
| | 10 | $N_2$ | 96 | 79 | 88 | 63 |
| AA/ | 2 | Air | * | 82 | 3 | 17 |
| AMPSA/ | 5 | Air | * | 84 | 0 | 32 |
| POE | 10 | Air | 29 | 81 | 2 | 0 |
| | 10 | $N_2$ | 80 | 84 | 79 | 67 |
| PAA | 2 | Air | 49 | 85 | 5 | 17 |
| | 5 | Air | 45 | 72 | 12 | 33 |
| | 10 | Air | 83 | 80 | 25 | 24 |
| | 20 | Air | 32 | 77 | 4 | 4 |
| | 10 | $N_2$ | 92 | 78 | 88 | 57 |
| AA/HPA | 10 | Air | 5 | 84 | 2 | 40 |
| | 10 | $N_2$ | 59 | 71 | 37 | 0 |
| PMA | 10 | $N_2$ | 62 | 72 | 89 | 15 |
| $MoO_4$ | 20 | $N_2$ | 59 | 58 | 10 | 7 |
| AA/AMPSA + $MoO_4$ | 10/20 | $N_2$ | 51 | 75 | 38 | 0 |
| Bayhibit AM + $MoO_4$ | 10/20 | $N_2$ | 77 | 63 | 57 | 7 |
| PAA + $MoO_4$ | 10/20 | $N_2$ | 62 | 67 | 90 | 0 |

*Deposit Weight Is Higher Than On Control

TABLE III

Inhibition of Silica/Silicates at pH 8.8 ± 0.2 Using Air For Cycling-Up and Holding Constant Cycles (1.8–2.0) for 7–8 Days

| Additive | Dosage (mg/L) | % Inhibition Deposit | Retention in Solution (mg/L) | | |
|---|---|---|---|---|---|
| | | | $SiO_2$ | Ca | Mg |
| PBTA | 10 | 85 | 59 | 8 | 0 |
| AA/AMPSA | 10 | 85 | 88 | 0 | 7 |
| AA/AMPSA/POE | 10 | 96 | 75 | 86 | 82 |
| PAA | 10 | 97 | 37 | 2 | 0 |
| PBTA + AA/AMPSA/POE | 10/10 | 94 | 81 | 0 | 10 |
| PBTA + AA/AMPSA/POE + $MoO_4^{-2}$ | 10/10/20 | 98 | 83 | 96 | 44 |
| | 5/5/10 | 91 | 83 | 0 | 19 |
| PBTA + PAA | 10/10 | 95 | 100 | 0 | 14 |
| PBTA + PAA + $MoO_4$ | | 100 | 91 | 100 | 95 |

TABLE IV

Inhibition of Silica/Silicates at pH 8.8 ± 0.2 Using Air For Cycling-Up and Make-up Water* and Holding Constant Cycles (1.8–2.0) For 7–8 Days

| Additive | Dosage (mg/L) | % Inhibition Deposit | Retention in Solution (mg/L) | | |
|---|---|---|---|---|---|
| | | | $SiO_2$ | Ca | Mg |
| PBTA | 10 | — | 45 | 11 | 0 |
| AA/AMPSA | 10 | 85 | 65 | 10 | 8 |
| AA/AMPSA/POE | 10 | 84 | 67 | 21 | 11 |
| $MoO_4$ | 20 | 16 | 58 | 3 | 0 |
| PBTA + $MoO_4$ | 10/20 | 69 | 70 | 0 | 9 |
| PBTA + AA/AMPSA/POE | 10/10 | 95 | 62 | 3 | 21 |
| PBTA + AA/AMPSA + $MoO_4$ | 10/10/20 | 96 | 89 | 100 | 100 |

*with 100 mg/L $HCO_3^-$ alkalinity added to the makeup water

What we claim is:

1. A method for controlling silica/silicate deposition in an aqueous system comprising adding to said system an effective amount of A) 2-phosphonobutane tricarboxylic acid-1,2,4 or a salt thereof, and B) a water-soluble polymer prepared from:

a) 50 to 80%, by weight, of an unsaturated carboxylic compound selected from the group consisting of acrylic acid, methacrylic acid, their salts and mixtures thereof; and b) 10 to 30%, by weight, of an unsaturated sulfonic compound selected from the group consisting of 2-acrylamido-2-methylpropyl sulfonic acid, 2-methacrylamide-2-methylpropyl sulfonic acid, their salts and mixtures thereof; and c) 5 to 15%, by weight, of an unsaturated polyalkylene oxide compound selected from the group consisting of: $CH_2=CH-CH_2(OCH_2\,CH_2)_n\,OH$, $CH_2=CH-CH_2\,(OCH_2\,CH_2)_n\,OCH_3$, wherein n is 5–10, and

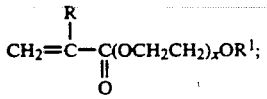

wherein R and $R^1$, which may be the same or different, are H or lower alkyl and x is 1–20; wherein said polymer has a weight average molecular weight of less than about 50,000 and wherein the weight ratio of A):B) ranges from about 1:3 to about 3:1.

2. The method of claim 1, wherein 2-phosphonobutane tricarboxylic acid-1,2,4 is added at a dosage of from about 0.1 to about 200 ppm.

3. The method of claim 1, wherein a molybdate ion source or a borate ion source is added as component C), wherein the weight ratio of A):C) ranges from about 1:5 to about 5:1.

4. The method of claim 1, wherein C) is a molybdate ion source.

5. The method of claim 2, wherein a molybdate ion source or a borate ion source is added as component C), wherein the weight ratio of A):C) ranges from about 1:5 to about 5:1.

6. The method of claim 5, wherein C) is a molybdate ion source.

* * * * *